US010726962B2

(12) United States Patent
Singh et al.

(10) Patent No.: US 10,726,962 B2
(45) Date of Patent: Jul. 28, 2020

(54) NUCLEAR REACTOR SYSTEM HAVING NATURAL CIRCULATION OF PRIMARY COOLANT

(71) Applicant: SMR Inventec, LLC, Marlton, NJ (US)

(72) Inventors: Krishna P. Singh, Hobe Sound, FL (US); P. Stephan Anton, Southampton, NJ (US); Ranga Nadig, Cherry Hill, NJ (US); Indresh Rampall, Cherry Hill, NJ (US)

(73) Assignee: SMR INVENTEC, LLC, Marlton, NJ (US)

( * ) Notice: Subject to any disclaimer, the term of this patent is extended or adjusted under 35 U.S.C. 154(b) by 186 days.

(21) Appl. No.: 15/413,770

(22) Filed: Jan. 24, 2017

(65) Prior Publication Data

US 2017/0133112 A1 May 11, 2017

Related U.S. Application Data

(63) Continuation of application No. 13/577,163, filed as application No. PCT/US2011/023952 on Feb. 7, 2011, now abandoned.

(Continued)

(51) Int. Cl.
*G21C 15/26* (2006.01)
*G21C 1/08* (2006.01)
(Continued)

(52) U.S. Cl.
CPC ............. *G21C 15/26* (2013.01); *G21C 1/086* (2013.01); *G21C 7/32* (2013.01); *G21C 13/04* (2013.01);
(Continued)

(58) Field of Classification Search
CPC ........ G21C 15/26; G21C 1/086; G21C 13/04; G21C 15/12; G21C 7/32; G21D 1/006
(Continued)

(56) References Cited

U.S. PATENT DOCUMENTS

| 2,890,009 A | 6/1959 | Chapellier |
| 3,761,220 A | 9/1973 | Dirne |

(Continued)

FOREIGN PATENT DOCUMENTS

| CN | 101441902 | 5/2009 | |
| DE | 3620672 A1 * | 12/1987 | ............. G21C 15/26 |

(Continued)

OTHER PUBLICATIONS

IAEA, "Integral design concepts of advanced water cooled reactors", Vienna, 1997, IAEA-TECDOC-977. (Year: 1997).*

(Continued)

*Primary Examiner* — Jack W Keith
*Assistant Examiner* — Daniel Wasil
(74) *Attorney, Agent, or Firm* — The Belles Group, P.C.

(57) ABSTRACT

A nuclear reactor system that, in one embodiment, utilizes natural circulation to circulate a primary coolant in a single-phase through a reactor core and a heat exchange subsystem. The heat exchange subsystem is located outside of the nuclear reactor pressure vessels and, in some embodiments, is designed so as to not cause any substantial pressure drop in the flow of the primary coolant within the heat exchange sub-system that is used to vaporize a secondary coolant. In another embodiment, a nuclear reactor system is disclosed in which the reactor core is located below ground and all penetrations into the reactor pressure vessel are located above ground.

10 Claims, 5 Drawing Sheets

Related U.S. Application Data

(60) Provisional application No. 61/416,954, filed on Nov. 24, 2010, provisional application No. 61/333,551, filed on May 11, 2010, provisional application No. 61/302,069, filed on Feb. 5, 2010.

(51) Int. Cl.
  *G21C 7/32* (2006.01)
  *G21C 13/04* (2006.01)
  *G21C 15/12* (2006.01)
  *G21D 1/00* (2006.01)

(52) U.S. Cl.
  CPC ............. *G21C 15/12* (2013.01); *G21D 1/006* (2013.01); *Y02E 30/32* (2013.01); *Y02E 30/39* (2013.01)

(58) Field of Classification Search
  USPC .............................. 376/273, 274, 298, 402
  See application file for complete search history.

(56) References Cited

U.S. PATENT DOCUMENTS

| | | | |
|---|---|---|---|
| 3,888,734 A | 6/1975 | Juric | |
| 3,916,944 A | 11/1975 | Crawford et al. | |
| 4,045,289 A * | 8/1977 | Seidensticker | G21C 13/00 376/273 |
| 4,200,061 A | 4/1980 | Sterk et al. | |
| 4,298,431 A | 11/1981 | Depierre et al. | |
| 4,363,779 A | 12/1982 | Fajeau | |
| 4,660,510 A | 4/1987 | Draper | |
| 4,666,654 A * | 5/1987 | Forsberg | G21C 1/084 376/282 |
| 4,705,662 A | 11/1987 | Tilliette | |
| 4,769,209 A * | 9/1988 | Tower | G21C 1/08 376/402 |
| 4,783,310 A * | 11/1988 | Keegan | G21C 13/028 376/288 |
| 4,859,401 A | 8/1989 | Murase et al. | |
| 4,905,757 A | 3/1990 | Boardman et al. | |
| 4,947,485 A | 8/1990 | Oosterkamp | |
| 4,986,956 A | 1/1991 | Garabedian | |
| 5,053,190 A * | 10/1991 | Gardner | G21C 15/18 376/406 |
| 5,093,075 A * | 3/1992 | Chevereau | G21C 7/08 376/400 |
| 5,094,803 A | 3/1992 | Nishiguchi | |
| 5,102,616 A | 4/1992 | Gardner et al. | |
| 5,204,054 A * | 4/1993 | Townsend | G21C 1/084 376/273 |
| 5,223,208 A | 6/1993 | Ishimaru | |
| 5,229,067 A | 7/1993 | Hammers | |
| 5,291,533 A | 3/1994 | Orr | |
| 5,420,897 A | 5/1995 | Kasai et al. | |
| 5,579,355 A | 11/1996 | Leidemann et al. | |
| 5,612,982 A | 3/1997 | Woodcock et al. | |
| 5,761,262 A | 6/1998 | No et al. | |
| 5,774,517 A | 6/1998 | Palavecino et al. | |
| 7,245,689 B2 | 7/2007 | Nakayama et al. | |
| 2006/0081359 A1 | 4/2006 | Franke et al. | |
| 2006/0270882 A1 | 11/2006 | Brown et al. | |
| 2007/0133732 A1 | 6/2007 | Nakayama et al. | |
| 2007/0201605 A1 | 8/2007 | Ishii et al. | |
| 2009/0034675 A1 | 2/2009 | Hamasaki et al. | |
| 2009/0129531 A1 | 5/2009 | Reyes, Jr. et al. | |
| 2010/0124303 A1 | 5/2010 | Young et al. | |
| 2010/0322369 A1 | 12/2010 | Nishiguchi | |

FOREIGN PATENT DOCUMENTS

| | | |
|---|---|---|
| JP | H05-240991 | 9/1993 |
| JP | H07-18946 | 3/1995 |
| JP | 2000-275379 | 10/2000 |
| JP | 2005-009999 | 1/2005 |

OTHER PUBLICATIONS

"Natural circulation data and methods for advanced water cooled nuclear power plant designs" International Atomic Energy Agency. Apr. 2002. pp. 1-246. IAEA-TECDOC-1281.IAEA. Austria.
Project Design of 200MW Nuclear Heating Plant with English abstract, dated Aug. 1993.

* cited by examiner

NUCLEAR REACTOR SYSTEM HAVING NATURAL CIRCULATION OF PRIMARY COOLANT

CROSS-REFERENCE TO RELATED PATENT APPLICATIONS

This application is a continuation of U.S. patent application Ser. No. 13/577,163, filed Aug. 3, 2012, which is a national stage entry of International Application No. PCT/US2011/023952, filed Feb. 7, 2011, which claims the benefit of U.S. Provisional Patent Application No. 61/416,954, filed Nov. 24, 2010, U.S. Provisional Patent Application No. 61/333,551, filed May 11, 2010, and U.S. Provisional Patent Application No. 61/302,069, filed Feb. 5, 2010, the entireties of which are herein incorporated by reference.

FIELD OF THE INVENTION

The present invention relates generally to nuclear reactor systems, and specifically to nuclear reactor systems that utilize natural circulation of the primary coolant in a single-phase, such as pressurized water reactors ("PWRs").

BACKGROUND OF THE INVENTION

Over recent years, a substantial amount of interest has grown in developing commercially viable PWRs that utilize the phenomenon of natural circulation (also known as thermosiphon effect) to circulate the primary coolant to both cool the nuclear reactor and to vaporize a secondary coolant into motive vapor.

CAREM (Argentina) is a 100 MW(e) PWR reactor design with an integrated self-pressurized primary system through which the primary coolant circulation is achieved by natural circulation. The CAREM design incorporates several passive safety systems. The entire primary system including the core, steam generators, primary coolant and steam dome are contained inside a single pressure vessel. The strong negative temperature coefficient of reactivity enhances the self-controlling features. The reactor is practically self-controlled and need for control rod movement is minimized. In order to keep a strong negative temperature coefficient of reactivity during the whole operational cycle, it is not necessary to utilize soluble boron for burn-up compensation. Reactivity compensation for burn-up is obtained with burnable poisons, i.e. gadolinium oxide dispersed in the uranium di-oxide fuel. Primary coolant enters the core from the lower plenum. After being heated the primary coolant exits the core and flows up through the riser to the upper dome. In the upper part, the primary coolant leaves the riser through lateral windows to the external region, then flows down through modular steam generators, decreasing its enthalpy by giving up heat to the secondary coolant in the steam generator. Finally, the primary coolant exits the internal steam generators and flows down through the down-corner to the lower plenum, closing the circuit. CAREM uses once-through straight tube steam generators. Twelve steam generators are arranged in an annular array inside the pressure vessel above the core. The primary coolant flows through the inside of the tubes, and the secondary coolant flows across the outside of the tubes. A shell and two tube plates form the barrier between primary and secondary coolant flow circuits.

AST-500 (Russia) is a 500 MW(th) reactor design intended to generate low temperature heat for district heating and hot water supply to cities. AST-500 is a pressurized water reactor with integral layout of the primary components and natural circulation of the primary coolant. Features of the AST-500 reactor include natural circulation of the primary coolant under reduced working parameters and specific features of the integral reactor, such as a built-in steam-gas pressurizer, in-reactor heat exchangers for emergency heat removal, and an external guard vessel.

V-500 SKDI *(Russia) is a 500 MW(e) light water integral reactor design with natural circulation of the primary coolant in a vessel with a diameter less than 5 m. The reactor core and the steam generators are contained within the steel pressure vessel (i.e., the reactor pressure vessel). The core has 121 shroudless fuel assemblies having 18 control rod clusters. Thirty six fuel assemblies have burnable poison rods. The hot primary coolant moves from the core through the riser and upper shroud windows into the steam generators located in the downcomer. The coolant flows due to the difference in coolant densities in the downcomer and riser. The pressurizer is connected by two pipelines, to the reactor pressure vessel and the water clean up system.

The NHR-200 (China) is a design for providing heat for district heating, industrial processes and seawater desalination. The reactor power is 200 MW(th). The reactor core is located at the bottom of the reactor pressure vessel (RPV). The system pressure is maintained by N2 and steam. The reactor vessel is cylindrical. The RPV is 4.8 m in diameter, 14 m in height, and 197 tons in weight. The guard vessel consists of a cylindrical portion with a diameter of 5 m and an upper cone portion with maximum 7 m in diameter. The guard vessel is 15.1 m in height and 233 tons in weight. The core is cooled by natural circulation in the range front full power operation to residual heat removal. There is a long riser on the core outlet to enhance the natural circulation capacity. The height of the riser is about 6 m. Even in case of interruption of natural circulation in the primary circuit due to a LOCA the residual heat of the core can be transmitted by steam condensed at the uncovered tube surface of the primary heat exchanger.

While the aforementioned PWRs utilize natural circulation of the primary coolant to both cool the reactor core and heat the secondary coolant, all of these natural circulation PWRs suffer from the drawback that the heat exchange equipment is integrated with and located within the reactor pressure vessel. Such an arrangement not only makes the heat exchange equipment difficult to repair and/or service but also subjects the equipment to corrosive conditions. Furthermore, locating the heat exchange equipment within the reactor pressure vessel results in increased complexity and a potential increase in the number of penetrations into the reactor pressure vessel. However, prior to the present invention, the location of the heat exchange equipment within the reactor pressure vessel was likely deemed necessary to achieve the natural circulation of the primary coolant in the PWR cycle.

A drawback of other PWRs that exist in the art is the fact that the reactor pressure vessels have penetrations at both the top portion of the reactor pressure vessel and at the bottom portion of the reactor pressure vessel. Still another drawback of existing PWRs is the fact that a substantial length of piping and a large number of joints are used carry the primary coolant from the reactor pressure vessel to the heat exchange equipment, thereby increasing the danger of failure due to a pipe break scenario.

BRIEF SUMMARY OF THE INVENTION

These, and other drawbacks, are remedied by the present invention. A nuclear reactor system is presented herein that, in one embodiment, utilizes natural circulation (i.e., thermosiphon) to circulate a primary coolant in a single-phase through a reactor core and a heat exchange sub-system, wherein the heat exchange sub-system is located outside of the nuclear reactor pressure vessel. In some embodiments, the heat exchange sub-system is designed so as to not cause any substantial pressure drop in the flow of the primary coolant within the heat exchange sub-system that is used to vaporize a secondary coolant. In another embodiment, a nuclear reactor system is disclosed in which the reactor core is located below ground and all penetrations into the reactor pressure vessel are located above ground. In certain embodiment, the inventive nuclear reactor system is a PWR system.

In one embodiment, the invention can be a natural circulation nuclear reactor system comprising: a reactor pressure vessel having an internal cavity; a reactor core comprising nuclear fuel disposed within the internal cavity at a bottom portion of the reactor pressure vessel; a heat exchange sub-system located outside of the reactor pressure vessel; a closed-loop primary coolant circuit that flows a primary coolant through the reactor pressure vessel to cool the reactor core and through the heat exchange sub-system to transfer heat to a secondary coolant; and wherein operation of the reactor core causes natural circulation of the primary coolant through the closed-loop primary coolant circuit in a single phase.

In another embodiment, the invention can be a nuclear reactor system comprising: an elongated reactor pressure vessel having an internal cavity containing a primary coolant, the reactor pressure vessel extending along a substantially vertical axis, a major portion of the axial length of the reactor pressure vessel located below a ground level; a reactor core comprising nuclear fuel disposed within the internal cavity at a bottom portion of the reactor pressure vessel reactor and below the ground level; the reactor pressure vessel comprising a primary coolant outlet port located above the ground level; the reactor pressure vessel comprising a primary coolant inlet port located above the ground level; a heat exchange sub-system located outside of the reactor pressure vessel and above the ground level, an incoming hot leg of the heat exchange system fluidly coupled to the primary coolant outlet port and an outgoing cold leg of the heat exchange system fluidly coupled to the primary coolant inlet port; and wherein the major portion of the reactor pressure vessel is free of penetrations.

In yet another embodiment, the invention can be a nuclear reactor system comprising: an elongated reactor pressure vessel having an internal cavity containing a primary coolant, the reactor pressure vessel extending along a substantially vertical axis; a reactor core comprising nuclear fuel disposed within the internal cavity at a bottom portion of the reactor pressure vessel reactor; a partition dividing the internal cavity of the reactor pressure vessel into a primary coolant riser passageway and a primary coolant downcomer passageway, the reactor core disposed within the primary coolant riser passageway; the reactor pressure vessel comprising a primary coolant outlet port in fluid communication with a top portion of the primary coolant riser passageway; the reactor pressure vessel comprising a primary coolant inlet port in fluid communication with a top portion of the primary downcomer riser passageway; at least one steam generator located outside of the reactor pressure vessel, an incoming hot leg of the steam generator fluidly coupled to the primary coolant outlet port and an outgoing cold leg of the steam generator fluidly coupled to the primary coolant inlet port; and wherein the steam generator does not cause any substantial pressure drop in a flow of the primary coolant through the steam generator resulting from an increase in elevation.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE DRAWINGS

Figure 1:
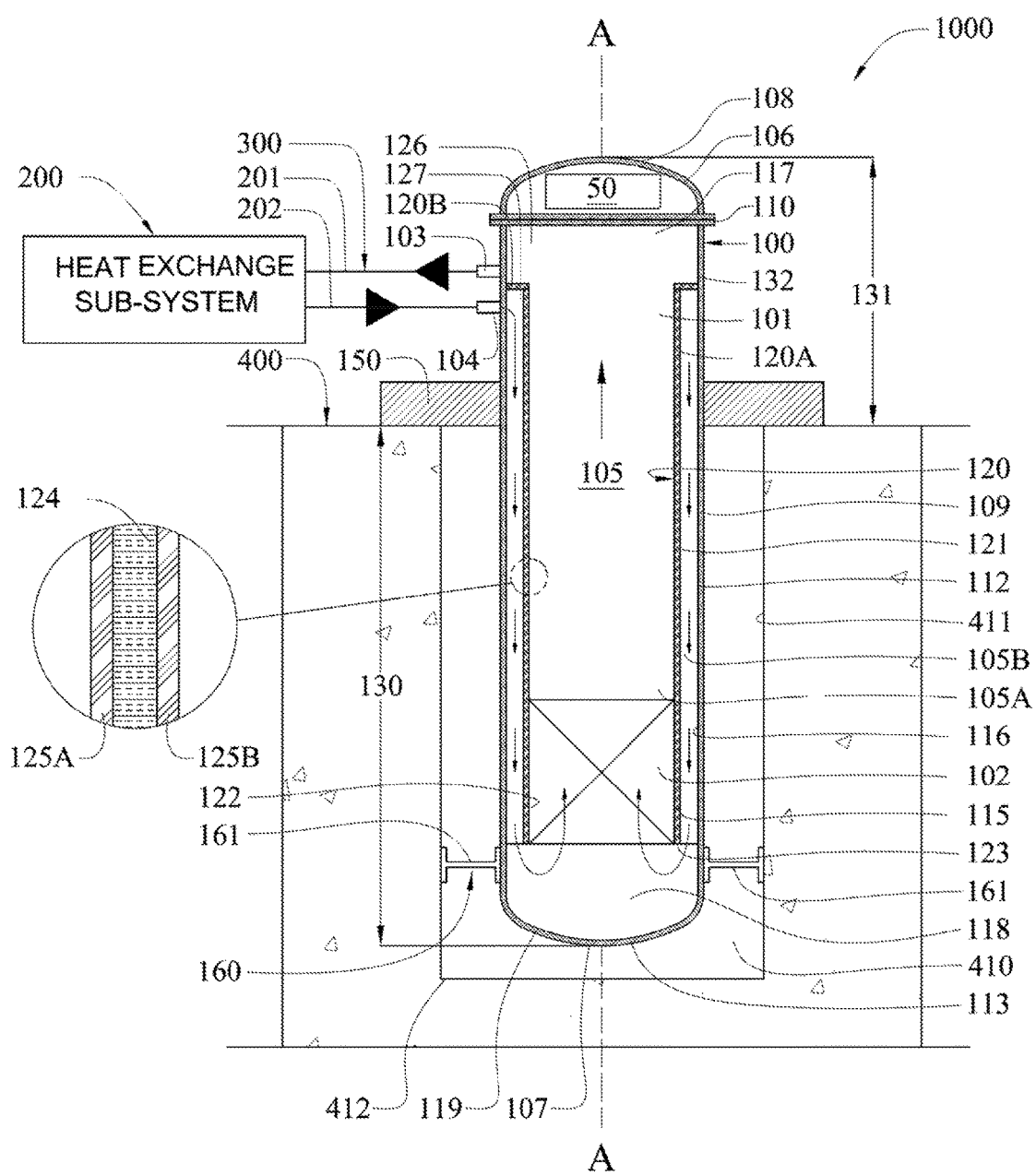
FIG. 1 is a schematic of a natural circulation nuclear reactor system according to one embodiment of the present invention.

The following description of the preferred embodiment(s) is merely exemplary in nature and is in no way intended to limit the invention, its application, or uses.

Prior to discussing FIGS. 1-5 in detail, an overview of one specific embodiment of the inventive natural circulation reactor system, and its operation, will be set forth. Those skilled in the art will appreciate that the overview is directed to one very specific embodiment and that the details thereof are not limiting of the present invention in all embodiments. Furthermore, those skilled in the art will appreciate how the overview applies to the subsequent detailed discussion of FIGS. 1-5.

I. Overview of One Potential Commercial Embodiment

The inventive nuclear reactor system, in one potential commercial embodiment, is a 145 MWe nuclear reactor designed to provide an economical and safe source of clean energy from nuclear fission. Strengths of the inventive nuclear reactor system include its inherent safety and simplicity of operation. The operational simplicity of the inventive nuclear reactor system and the modest outlay required to establish and commission it will make it possible to deliver the fruits of pollution-free nuclear energy to the vast mass of humanity around the globe that does not presently have access to a reliable source of power or to a robust electrical enemy delivery system. Competitive with large nuclear reactors on a per-megawatt basis, the inventive nuclear reactor system is tailored to add generation capacity to the installed base incrementally with incremental capital outlays. Due to its inherent operational simplicity, the inventive nuclear reactor system requires a minimal cadre of trained personnel to run the plant. Multiple units of the inventive nuclear reactor system can be clustered at one location or geographically dispersed without a significant increase in the per-megawatt construction cost. Geographical dispersal and underground configuration serve as natural antidotes to post-9/11 concerns. The modest power output of the inventive nuclear reactor system makes it a viable candidate source of reliable electrical energy or for providing heating steam to a city or process steam as a cogeneration plant serving an industrial plant.

As a passive small modular reactor of the PWR genre with safety, ease of maintenance and superb security, the inventive nuclear reactor system is ideally suited to serve as a reliable power source to strategic national assets of any country. Design features of the inventive nuclear reactor system that speak to its inherent safety and reliability are:

1. Reactor Core Deep Underground

The reactor core resides deep underground in a thick-walled reactor pressure vessel (RPV) made of an ASME Code material that has decades of proven efficacy in maintaining reactor integrity in large PWR and BWR reactors. All surfaces wetted by the reactor coolant are made of stainless steel or Inconel, which eliminates a major source of crud accumulation in the reactor vessel.

2. Natural Circulation of the Reactor Coolant

The inventive nuclear reactor system does not rely on any active components, such as a reactor coolant pump, for circulating the primary coolant through the closed-loop primary coolant circuit, which includes flow through the reactor core and the heat exchange sub-system. Instead, the flow of the primary coolant through the reactor pressure vessel, the horizontal steam generators, and other miscellaneous equipment occurs by the pressure head created by density differences in the flowing water in the hot and cold segments of the closed-loop primary coolant circuit. The reliability of gravity as a motive force underpins inherent safety of the inventive nuclear reactor system. The movement of the primary coolant requires no pumps, valves, or moving machinery of any kind, in certain embodiments.

3. No Reliance on Off-Site Power

Offsite power is not essential for shutting down the inventive nuclear reactor system. The rejection of reactor residual heat during the shutdown also occurs by natural circulation. Thus, the need for an emergency shutdown power supply at the site—a major concern for nuclear plants—is eliminated.

4. Assurance of a Large Inventory of Water Around and Over the Reactor Core

The reactor pressure vessel of the inventive nuclear reactor system has no penetrations in its below-ground portion, which can be the bottom 100 feet, which means that the reactor core will remain submerged in a large inventory of water. All penetrations in the reactor pressure vessel are located in the above-ground portion, or top portion, of the reactor pressure vessel and are small in size. The absence of large piping in the closed-circuit primary coolant circuit precludes the potential of a "large break" LOCA event.

5. All Critical Components Readily Accessible

Both the heat exchange sub-system, which includes the steam generators, and the control rod drive system are located outside the reactor pressure vessel at a level that facilitates easy access, making their preventive maintenance and repair a conveniently executed activity. Each of the steam generators is a horizontal pressure vessel with built-in design features to conveniently access and plug tubes.

6. Demineralized Water

The primary coolant (which can also be referred to as the reactor coolant) is demineralized water, which promotes criticality safety because of its strong negative reactivity gradient with rise in temperature. Elimination of borated water also simplifies the nuclear steam supply system (NSSS) by eliminating the systems and equipment needed to maintain and control boron levels in the primary coolant. Pure water and corrosion resistant primary coolant loop help minimize crud buildup in the reactor pressure vessel.

7. Modularity

One can build only one of the inventive nuclear reactor systems at a site, or a large number thereof. Clustering a number of inventive nuclear reactor systems at one site will reduce the overall O&M costs.

8. Long Operating Cycle

The inventive nuclear reactor system will operate for approximately 3.5 years before requiring refueling.

9. Short Construction Life Cycle

Virtually all components of the inventive nuclear reactor system are shop fabricated. Site work is limited to reinforced concrete construction and a limited amount of welding to assemble the shop-built equipment and parts. As a result, it is possible to complete the construction of one of the inventive nuclear reactor systems in 24 months from the first shovel in the ground.

10. Efficient Steam Cycle

A pair of two horizontal steam generators are arranged in series and integrally welded to the reactor pressure vessel. The efficiency of the power cycle of the inventive nuclear reactor system, and its compactness, is further enhanced by superheaters that are integrally welded to the horizontal steam generators. The superheaters, one attached to each steam generator, increases cycle efficiency and also protect both the high pressure and low pressure turbines from the deleterious effect of moist steam.

11. Integral Pressurizer

The design of the reactor pressure vessel incorporates an integral pressurizer that occupies the upper reaches of the reactor pressure vessel. The pressurizer serves to control the pressure in the reactor vessel.

12. Suitable for Water-Challenged Sites

The inventive nuclear reactor system can be installed at sites with limited water availability, such as creeks and small rivers that are inadequate for large reactors. The inventive nuclear reactor system can be operated equally well in a water-challenged region by using air-cooled condenser technology to reject the plant's waste heat. Using air in lieu of water, of course, results in a moderate increase in the plant's cost.

12. System Parameters in the Safe and Proven Range

The operating pressure and temperature within the reactor pressure vessel is in the proven range for PWRs. Lower core power density than that used in large PWRs for improved thermal-hydraulic control (please see table below) and an improved margin to departure-from-nucleate boiling in the reactor core.

| Exemplary System Parameters | Data |
| --- | --- |
| Number of fuel assemblies in the core | 32 |
| Nominal thermal power, MWt | 446 |
| Nominal recirculation rate, MLb per hour | 5.46 |
| Reactor water outlet temperature, deg. F. | 580 |
| Reactor water inlet temperature, deg. F. | 333 |
| Reactor pressure, pounds per sq. inch | 2,250 |
| Water in the RV cavity, gallons | 30,00 |

13. Minimized Piping Runs and Minimum Use of Active Components to Enhance Reliability and Cost Competitiveness The amount of piping in the close-loop primary coolant circuit and the secondary coolant circuit in the inventive nuclear reactor system is the least of any nuclear plant design on the market, as is the number of pumps and valves.

14. In-Service Inspection

All weld seams in the primary system including those in the reactor pressure vessel wall are available at all times for inspection. In particular, the weld seams in the reactor pressure vessel can be inspected by operating a manipulator equipped in-service inspection device in the reactor well during power generation. Thus, inventive nuclear reactor system exceeds the in-service inspection capability expected of nuclear plants under ASME Code Section XI.

15. Earthquake Hardened Design

Virtually all major equipment in the inventive nuclear reactor system are either underground or horizontally mounted to withstand strong seismic motions. This includes the reactor pressure vessel, the fuel pool, the reactor water storage tank (all underground) and the horizontal steam generators, the horizontal superheaters, and the horizontal kettle reboiler that are floor mounted.

16. Aircraft Impact Proof Containment

The containment structure of the inventive nuclear react system is designed to withstand the impact of a crashing lighter plane or a commercial liner without sustaining a thin-wall breach.

II. Detail

Referring now to FIG. 1, a natural circulation nuclear reactor system 1000 (hereinafter the "reactor system 1000") is illustrated according to one embodiment of the present invention. The reactor system 1000 generally comprises a reactor pressure vessel 100 and a heat exchange sub-system 200. The reactor pressure vessel 100 contains a primary coolant 101 that is used to cool the rector core 102 and to heat a secondary coolant within the heat exchange sub-system 200. The reactor pressure vessel 100 is fluidly coupled to an incoming hot leg 201 of the heat exchange sub-system 200 via a primary coolant outlet port 103. Similarly, the reactor pressure vessel 100 is also fluidly coupled to an outgoing cool leg 202 of the heat exchange sub-system 200 via a primary coolant inlet port 104. As a result, a closed-loop primary coolant circuit 300 is formed through which the primary coolant 101 flows in a single-phase. As discussed in greater detail below, the flow of the primary coolant 101 through the closed-loop primary coolant circuit is a natural circulation flow induced by the heat given off by the normal operation of the reactor core 102.

In certain embodiments, the internal cavity 105 of the reactor pressure vessel 100 is maintained under sufficient pressure to maintain the primary coolant 101 in a liquid-phase despite the high temperature within the rector pressure vessel 100. In the exemplified embodiment, a pressure control sub-system 50 (commonly referred to in the art as a pressurizer) is located within a top region of the reactor pressure vessel 100 and is configured to control the pressure of the internal cavity 105 of the reactor pressure vessel 100. The pressure control sub-system 50 is integral with the removable head 106 of the reactor pressure vessel 100 to prevent line break concerns and to provide a more compact reactor system 1000. Pressurizers are well known in the art and any standard pressurizer could be used as the pressure control sub-system 50. In one embodiment, the internal cavity 105 of the reactor pressure vessel 100 is maintained at a pressure in a range of 2000 psia to 2500 psia. In one more specific embodiment, the internal cavity 105 of the reactor pressure vessel 100 is maintained at a pressure between 2200 psia to 2300 psia. Of course, the exact pressure maintained in the internal cavity 105 of the reactor pressure vessel 100 is not to be limiting of the invention unless specifically claimed.

The reactor pressure vessel 100 is an elongated tubular pressure vessel formed by a thick wall made of an acceptable ASME material, such as stainless steel. The reactor pressure vessel 100 extends from a bottom end 107 to a top end 108 along a substantially vertical axis A-A, thereby defining an axial length of the reactor pressure vessel 100. In one embodiment, the reactor pressure vessel 100 has an axial length of over 100 feet to facilitate an adequate level of turbulence in the recirculating primary coolant 101 from the natural circulation (also referred to as thermosiphon action in the art). In certain other embodiments, the reactor pressure vessel 100 has an axial length in a range between 100 feet to 150 feet. Of course, the invention is not so limited in certain alternate embodiments.

The reactor pressure vessel 100 generally comprises a domed head 106 and a body 109. The domed head 106 is detachably coupled to a top end of the body 109 so as to be removable therefrom for refueling and maintenance. The domed head 106 can be coupled to the body 109 through the use of any suitable fastener, including bolts, clamps, or the like. In the exemplified embodiment, the body 109 comprises an upper flange 110 and the domed head 106 comprises a lower flange 111 that provided mating structures through which bolts 114 (FIG. 4) extend to couple the domed head 106 to the body 109. When the domed had 106 is coupled to the body 109, a hermetic seal is formed therebetween via the use of a gasket or other suitably contoured interface.

The body 109 of the reactor pressure vessel 100 comprises an upstanding tubular wall 112 and a domed bottom 113 that hermetically seals the bottom end 107 of the reactor pressure vessel 100. The tubular wall 112 has a circular transverse cross-sectional profile in the illustrated embodiment but can take on other shapes as desired. In the exemplified embodiment, the domed bottom 113 is integral and unitary with respect to the tubular wall 112. Of course, in other embodiments, the domed bottom 113 may be a separate structure that is secured to the tubular wall 112 via a welding or other hermetic connection technique, such as the flanged technique described above for the domed head 106 and the body 109. Integral and unitary construct of the domed bottom 113 and the body 109 is, however, preferable in certain embodiments as it eliminates seams and/or interfaces that could present rupture potential.

The reactor pressure vessel 100 forms an internal cavity 105 in which a reactor core 102 is housed. The reactor core 102 comprises nuclear fuel, in the form of fuel assemblies, as is known in the art. The details of the structure of the reactor core 102 are not limiting of the present invention in and the reactor system 1000 can utilize any type of reactor core or nuclear fuel. The reactor core 102 is positioned in a bottom portion 115 of the reactor pressure vessel 100. In one embodiment, the reactor core 102 has a core thermal power of 400 MWt to 600 MWt during the operation thereof.

In one embodiment, the reactor core 102 is comprised of vertically arrayed fuel assemblies. The spacing between the fuel assemblies is governed by the design objective of keeping the reactivity (neutron multiplication factor) at 1.0 at all locations in the reactor pressure vessel 100. The criticality control in the axial direction is provided by the built-in neutron poison in the fuel rods (called IFBAs by Westinghouse) and possibly by control rods.

A partition 120 is provided within the internal cavity 105 of the reactor pressure vessel 100 that divides the internal cavity into a primary coolant riser passageway 105A and a primary coolant downcomer passageway 105B. Both the passageways 105A, 105B are axially extending vertical passageways that form part of the closed-loop primary coolant circuit 300.

In the exemplified embodiment, the partition 120 comprises an upstanding tubular wall portion 120A and a transverse wall portion 120B. The tubular wall portion 120A is an annular tube that is mounted within the internal cavity 105 of the reactor pressure vessel 100 so as to be concentrically arranged with respect to the upstanding wall 112 of the reactor pressure vessel 100. As a result, the primary coolant downcomer passageway 105B is an annular passageway that circumferentially surrounds the primary coolant riser passageway 105A. The primary coolant downcomer passageway 105B is formed between an outer surface 121 of the upstanding tubular wall portion 120A of the partition 120 and the inner surface 116 of the upstanding wall 112 of the reactor pressure vessel 100. The primary coolant riser passageway 105B is formed by the inner surface 122 of the upstanding tubular wall portion 120A of the partition 120.

The transverse wall portion 120B is an annular ring-like plate that is connected to a top end of the of the upstanding tubular wall portion 120A of the partition 120 at one end and to the upstanding wall 112 of the reactor pressure vessel 100 on the other end. The transverse wall portion 120B acts a separator element that prohibits cross-flow of the primary coolant 101 between the primary coolant riser passageway 105A and the primary coolant downcomer passageway 105B within the top portion 117 of the reactor pressure vessel 100. In essence, the transverse wall portion 120B forms a roof of the primary coolant downcomer passageway 105B that prevents the heated primary coolant 101 that exits the reactor pressure vessel 100 via the primary coolant outlet port 103 from mixing with the cooled primary coolant 101 that enters the reactor pressure vessel 100 via the primary coolant inlet port 104, and vice-versa. Cross-flow of the primary coolant 101 between the primary coolant riser passageway 105A and the primary coolant downcomer passageway 105B is prohibited by the upstanding tubular wall portion 120A of the partition 120.

In addition to physically separating the flow of the heated and cooled primary coolant 101 within the primary coolant downcomer and riser passageways 105A, 105B as discussed above, the partition 120 also thermally insulates the cooled primary coolant 101 within the primary coolant downcomer passageway 105B from the heated primary coolant 101 within the primary coolant riser passageway 105A. Stated simply, one does not want heat to transfer freely through the partition 120. Thus, it is preferred that the partition 120 be an insulating partition in the sense that its effective coefficient of thermal conductivity (measured radially from the primary coolant riser passageway 105A to the primary coolant downcomer passageway 105B) is less than the coefficient of thermal conductivity of the primary coolant 101.

Making the effective coefficient of thermal conductivity of the partition 120 less than the coefficient of thermal conductivity of the primary coolant 101 ensures that the primary coolant 101 in the primary coolant downcomer passageway 105B remains cooler than the primary coolant 101 in the primary riser passageway 105A, thereby maximizing the natural circulation rate of the primary coolant 101 through the closed-loop primary coolant circuit 300. In a very simple construction, this can be achieved by creating the partition 120 out of a single solid material that has a low coefficient of thermal conductivity. However, it must be considered that the material should neither degrade nor deform under the operating temperatures and pressures of the reactor pressure vessel 100. In such an embodiment, the effective coefficient of thermal conductivity is simply the coefficient of thermal conductivity of the single solid material.

In the exemplified embodiment, the low coefficient of thermal conductivity of the partition 120 is achieved by making the partition 120 as a multi-layer construction. As exemplified, the partition 120 comprises an insulating layer 124 that is sandwiched between two outer layers 125A, 125B. In one embodiment, the insulating layer 124 is a refractory material while the outer layers 125A, 125B are stainless steel or another corrosion resistant material. In certain embodiments, the insulating layer 124 is full encased in the outer layers 125A, 125B.

The internal cavity 115 of the reactor pressure vessel 100 also comprises a plenum 118 at the bottom portion 115 of the reactor pressure vessel 100 that allows cross-flow of the primary coolant 101 from the primary coolant downcomer passageway 105B to the primary coolant riser passageway 105A. In the exemplified embodiment, the plenum 118 is created by the fact that the bottom end 123 of the upstanding tubular wall portion 120A of the partition 120 is spaced from the inner surface 119 of the domed bottom 113, thereby creating an open passageway. In alternate embodiments, the partition 120 may extend all the way to the inner surface 119 of the domed bottom 113. In such embodiments, the plenum 118 will be formed by providing a plurality of apertures/openings in the partition 120 so as to allow the desired cross-flow.

The internal cavity 105 further comprises a plenum 126 at the top portion 117 of the reactor pressure vessel 100. The plenum 126 allows the heated primary coolant 101 that is rising within the primary coolant riser passageway 105A to gather in the top portion 117 of the reactor pressure vessel 100 and then flow transversely outward from the vertical axis A-A and through the primary coolant outlet port 103.

The reactor core 102 is located within the primary coolant riser passageway 105A above the bottom plenum 118. During operation of the reactor core 102, thermal energy produced by the reactor core 102 is transferred into the primary coolant 101 in the primary coolant riser passageway 105A adjacent the reactor core 102, thereby becoming heated. This heated primary reactor coolant 101 rises upward within the primary coolant riser passageway 105A due to its decreased density. This heated primary coolant 101 gather in the top plenum 126 and exits the reactor pressure vessel 100 via the primary coolant outlet port 103 where it enters the heat exchange sub-system 200 as the incoming hot leg 201. In one embodiment, the heated primary coolant 101 entering the hot leg 201 of the heat exchanger has a temperature of at least 570° F., and in another embodiment a temperature in a range of 570° F. to 620° F.

This heated primary coolant 101 passes through the heat exchange sub-system 200 where its thermal energy is transferred to a secondary coolant (described below in greater detail with respect to FIG. 2), thereby becoming cooled and exiting the heat exchange sub-system 200 via the cold leg 202. When exiting the cold leg 202 of the heat exchange sub-system, this cooled primary coolant 101 has a temperature in a range of 300° F. to 400° F. in one embodiment. In another embodiment, the heat exchange sub-system 200 is designed so that the temperature differential between the heated primary coolant in the hot leg 201 and the cooled primary coolant in the cold leg is at least 220° F.

The cooled primary coolant 101 exiting the cold leg of the heat exchange sub-system 200 then enters the reactor pressure vessel 100 via the primary coolant inlet port 104, thereby flowing into a top portion 127 of the primary coolant downcomer passageway 105B. Once inside the primary coolant downcomer passageway 105B, the cooled primary coolant 101 (which has a greater density than the heated primary coolant 101 in the primary coolant riser passageway 105A) flows downward through the primary coolant downcomer passageway 105B into the bottom plenum 118 where it is drawn back up into the primary coolant riser passageway 105A and heated again by the reactor core 102, thereby completing a cycle through the closed-loop primary circuit 300.

As discussed above, operation of the reactor core 102 causes natural circulation of the primary coolant 101 through the closed-circuit primary coolant circuit 300 by creating a riser water column within the primary coolant riser passageway 105A and a downcomer water column within the primary coolant downcomer passageway 105B. In one embodiment, the riser water column and the downcomer water column have a vertical height in a range of 80 ft. to 150 ft., and more preferably from 80 ft. to 120 ft. The vigorousness of the natural circulation (or thermosiphon flow) is determined by the height of the two water columns (fixed by the reactor design), and the difference between the bulk temperature of the two water columns (in water the SES and the downcomer space). For example, water at 2200 psia and 580° F. has density of 44.6 lb/cubic feet. This density increases to 60.5 lb/cubic feet if the temperature reduces to 250° F. The hot and cold water columns 60 feet high will generate a pressure head of 6.6 psi which is available to drive natural circulation of the primary coolant 101 through the closed-loop primary coolant circuit 300. A 90 feet high column will generate 50% greater head (i.e., 9.9 psi).

As a result of the natural circulation of the primary coolant 101 achieved by the water columns and gravity, the reactor system 1000 is free of active equipment, such as pumps or fans, for forcing circulation of the primary coolant through the closed-loop primary coolant circuit.

In the embodiment illustrated in FIG. 1, the, primary coolant outlet port 103 is at a slightly lower elevation (1-3 ft.) than the primary coolant inlet port 104. However, in other embodiments, the primary coolant outlet port 103 and the primary coolant inlet port 104 will be at substantially the same elevation (see FIGS. 4 and 5). When the primary coolant outlet port 103 and the primary coolant inlet port 104 are at substantially the same elevation the partition 120 will be appropriately designed. Furthermore, as used herein, the term port includes mere apertures or openings.

In one embodiment, the primary coolant 101 is a liquid that has a negative reactivity coefficient. Thus, the chain reaction in the reactor core 102 would stop automatically if the heat rejection path to the heat exchange sub-system 200 is lost in a hypothetical scenario. Thus, the reactor system 1000 is inherently safe. In one specific embodiment, the primary coolant 101 is demineralized water. All systems and controls used to maintain boron concentration in the reactor vessel in a typical PWR are eliminated from the reactor system 1000. Moreover, the use of demineralized water as the primary coolant 101 and the existence of the corrosion resistant surfaces of the reactor pressure vessel 100 help maintain crud buildup to a minimum. The reactivity control in the reactor core 102 is maintained by a set of control elements (burnable poisons) that are suspended vertically and occupy strategic locations in and around the fuel assemblies to homogenize and control the neutron flux.

Figure 4:
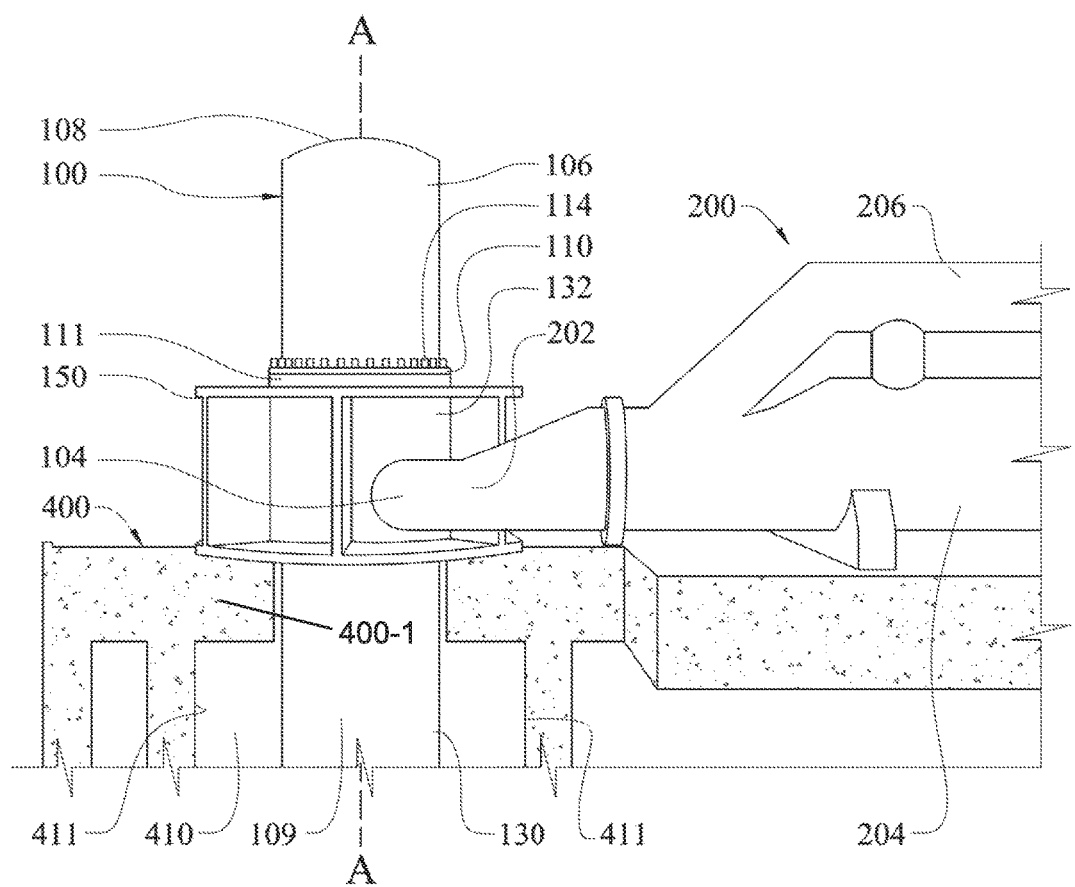
FIG. 4 is a side view of a portion of the natural circulation nuclear reactor system of FIG. 1 according to one structural embodiment.
Figure 5:
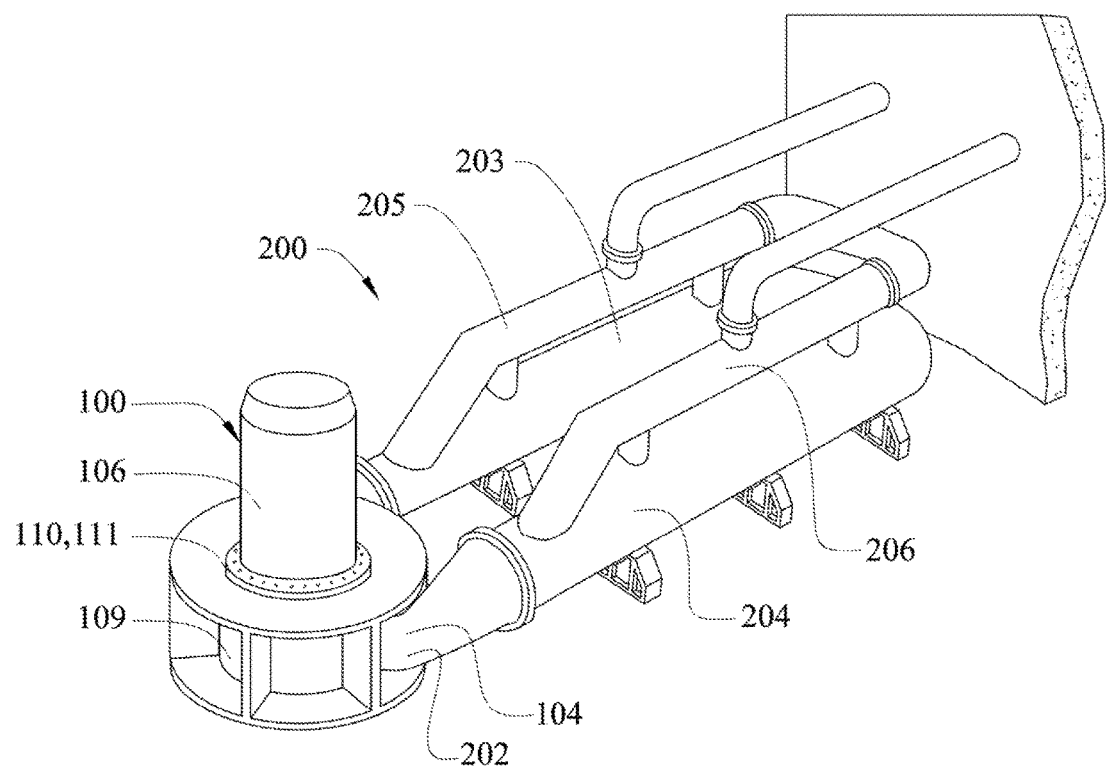
FIG. 5 is an elevated isometric view of a portion of the natural circulation nuclear reactor system of FIG. 1 according to one structural embodiment.

Referring now to FIGS. 1, 4 and 5 concurrently, it can be seen that a major portion 130 of the axial length of the reactor pressure vessel 100 located below a ground level 400 while a minor portion 131 of the axial length of the reactor pressure vessel 100 extends above the ground level 400. As such, the reactor core 102 is located deep below the ground level 400 while the heat exchange sub-system 200 is located above the ground level 400. In one embodiment, the heat exchange sub-system 200 is at an elevation that is 80 ft. to 150 ft, and preferably 80 ft. to 120 ft., greater than the elevation of the reactor core 102.

The minor portion 131 of the reactor pressure vessel 100 includes a top portion 132 of the body 109 and the domed head 106. The primary coolant outlet port 103 and the primary coolant inlet port 104 are located on the minor portion 131 of the reactor pressure vessel 100 that is above the ground level 400. More specifically, the primary coolant outlet port 103 and the primary coolant inlet port 104 are located on the top portion 132 of the body 109 of the reactor pressure vessel 100 that is above the ground level 400.

The major portion 130 includes a majority of the body 109 and the domed bottom 113. In certain embodiment, the major portion 130 of the reactor pressure vessel 130 is at least 75% of the axial length of the reactor pressure vessel 100. In other embodiments, the major portion 130 of the reactor pressure vessel 130 is between 60% to 95% of the axial length of the reactor pressure vessel 100. In another embodiment, the major portion 130 of the reactor pressure vessel 130 is between 75% to 95% of the axial length of the reactor pressure vessel 100.

The reactor pressure vessel 100 comprises a reactor flange 150 which is seated on and supports the vessel from a concrete slab 400-1 that defines the ground level 400. The top portion 132 of the body 109 of the reactor pressure vessel 100 is welded to the reactor flange 150, which is a massive upper forging. The reactor flange 150 also provides the location for the primary coolant inlet port 104 and the primary coolant outlet port 103 (FIGS. 4 and 5), and the connections to the heat exchange sub-system 200 (and for the engineered safety systems to deal with various postulated accident scenarios). This reactor flange 150 contains vertical welded lugs to support the weight of the reactor pressure vessel 100 in the reactor well 410 in a vertically oriented cantilevered manner (FIG. 1). As a result, the reactor pressure vessel 100 is spaced from the wall surfaces 411 and floor surface 412 of the reactor well 410, thereby allowing the reactor pressure vessel 100 to radially and axially expand as the reactor core 102 heats up during operation and causes thermal expansion of the reactor pressure vessel 100.

Furthermore, the major portion 130 of the reactor pressure vessel 100 is free of penetrations. In other words, the major portion 130 of the reactor pressure vessel 100 comprises no apertures, holes, opening or other penetrations that are either open or to which pipes or other conduits are attached. All penetrations (such as the primary coolant inlet and outlet ports 103, 104) in the reactor pressure vessel 100 are located in the above-ground minor portion 131, and more specifically in the top portion 132 of the body 109 of the reactor pressure vessel 100. In one embodiment, it is further preferred that the major portion 130 be a unitary construct with no connections, joints, or welds.

The bottom portion 115 of the reactor pressure vessel 100 is laterally restrained by a lateral seismic restraint system 160 that spans the space between the body 109 of the reactor pressure vessel 100 and the wall surfaces 411 of the reactor well 410 to withstand seismic events. The seismic restraint system 160, which comprises a plurality of resiliently compressible struts 161, allows for free axial and diametral thermal expansion of the reactor vessel. The bottom of the reactor well 410 contains engineered features to flood it with water to provide defense-in-depth against a (hypothetical, non-mechanistic) accident that produces a rapid rise in the enthalpy of the reactor's contents. Because the reactor system 1000 is designed to prevent loss of the primary coolant 101 by leaks or breaks and the reactor well 410 can be flooded at will, burn-through of the reactor pressure vessel 100 by molten fuel (corium) can be ruled out as a credible postulate. This inherently safe aspect simplifies the design and analysis of the reactor system 1000.

Figure 2:
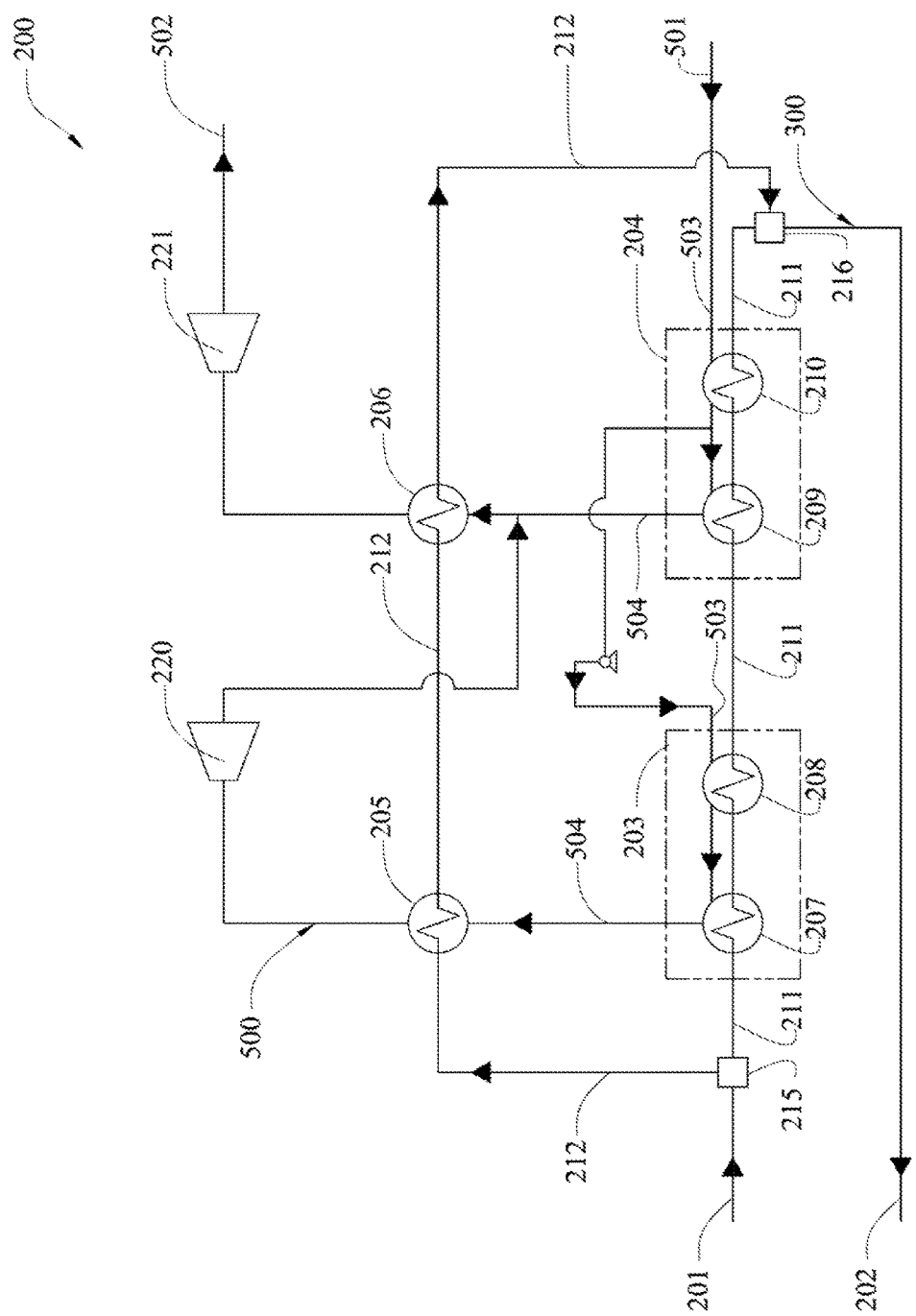
FIG. 2 is a schematic of an embodiment of a heat exchange sub-system that can be used in the natural circulation reactor system of FIG. 1.

Referring now to FIGS. 2 and 4-5 concurrently, an embodiment of the heat exchange sub-system 200 is illustrated. While a specific embodiment of the heat exchange sub-system 200 will be described herein, it is to be understood that, in alternate embodiments, one or more of components can be omitted as desired. For example, in certain embodiments, one or both of the horizontal superheaters 205, 206 may be omitted. In certain other embodiments, one of the horizontal steam generators 203, 204 may be omitted and/or combined into the other one of the horizontal steam generators 203, 204. Moreover, additional equipment may be incorporated as necessary so long as the natural circulation of the primary coolant 101 through the closed-loop primary coolant circuit 300 is not prohibited through the introduction of substantial head loss.

As mentioned above, the heat exchange subsystem 200 comprises an incoming hot leg 201 that introduces heated primary coolant into the portion of the closed-loop primary coolant circuit 300 that passes through the heat exchange sub-system 200 and an outgoing cold leg 202 that removes cooled primary coolant from the portion of the closed-loop primary coolant circuit 300 that passes through the heat exchange sub-system 200. In order to minimize (and in some embodiments eliminate) pressure loss in the closed-loop primary coolant circuit 300 caused by an increase in the elevation of the primary coolant flow, the steam generators 203, 204 and the superheaters 205, 206 are all of the horizontal genre (i.e., the tubes which carry the primary coolant extend substantially horizontal through the shell-side fluid) and are in horizontal alignment with each other where possible.

Within the heat exchange sub-system 200, the primary coolant flow of the closed-loop primary coolant circuit 300 is divided into two paths 211, 212 at a flow divider 215. The flow divider 210 can be a three-way valve, a three-way mass flow controller, or a simple Y plumbing joint. The first path 211, which carries the majority of the primary coolant flow, travels through the first horizontal steam generator 203 and then through the second horizontal steam generator 204. Meanwhile, second path 212, which carries a minority of the primary coolant flow, travels through the first horizontal superheater 205 and then through the second horizontal superheater 206. After passing through the first and second horizontal steam generators 203, 204 and the first and second horizontal superheaters 205, 206, the first and second paths 211, 212 converge in a flow converger 216, which combines the primary coolant flows of the first and second paths 211, 212 and directs the combined flow to the outgoing cold leg 202. As with the flow divider 215, the flow converger 216 may be a three-way valve, a three-way mass flow controller, or a simple Y plumbing joint.

In one embodiment, 10% to 15% of the incoming primary coolant flow that enters the heat exchange sub-system 200 via the hot leg 201 is directed into the second path 212 while the remaining 85% to 90% of the incoming primary coolant is directed into the first path 211. In one specific example, the incoming primary coolant that enters the heat exchange sub-system 200 via the hot leg 201 has a flow rate of 5 to 7 million lbs./hr. In this example, 0.6 to 1 million lbs./hr. of the primary coolant is directed into the second path 212 while the remainder of the primary coolant flow is directed into the first path 211.

The first and second horizontal steam generators 203, 204 are operably coupled in series to one another along the first path 211 of the closed-loop primary coolant circuit 300. Both of the horizontal steam generators 203, 204 are horizontally disposed shell-and-tube heat exchangers. The first horizontal steam generator 203 is a high pressure steam generator while the second horizontal steam generator 204 is a low pressure steam generator (in comparison to the high pressure steam generator). The high first steam generator 203 is located upstream of the second horizontal steam generator 204 along the closed-loop primary coolant circuit 300. Similarly, the first and second horizontal superheaters 205, 206 are operably coupled in series to one another along the second path 212 of the closed loop primary coolant circuit 300. The first horizontal superheater 205 is a high pressure superheater while the second horizontal superheater 206 is a low pressure superheater (in comparison to the high pressure superheater). The high first steam superheater 205 is located upstream of the second horizontal superheater 206 along the closed-loop primary coolant circuit 300. Furthermore, the first and second superheaters 205, 206 are located in parallel to the first and second horizontal steam generators 203, 204 along the closed-loop primary coolant circuit 300.

Furthermore, the first and second horizontal steam generators 203, 204 are interconnected by a return header so that the hot primary coolant entering the first horizontal steam generator 203 heats the secondary coolant to make steam for the high-pressure turbine 220 and then proceeds to the second horizontal steam generator 204 with minimal pressure loss to make steam for the low-pressure turbine 221.

The flow of the primary coolant in the first path 211 is used to convert a secondary coolant flowing through the shell-side of the first and second horizontal steam generators 203, 204 from liquid-phase to gas-phase through the transfer of heat form the primary coolant to the secondary coolant within the first and second horizontal steam generators 203, 204. Because the flow of the primary coolant through the first and horizontal second steam generators 203, 204 is substantially horizontal in nature, the flow of the primary coolant through the first path 211 does not cause any substantial pressure drop in the closed-loop primary coolant circuit 300 resulting from an increase in elevation. Moreover, because of the horizontal alignment of the first and second horizontal steam generators 203, 204 with each other and the primary coolant outlet and inlet ports 103, 104 of the reactor pressure vessel 100 (FIG. 5), the primary coolant flow that travels along the first path 211 from the primary coolant outlet port 103 of the reactor pressure vessel 100 to the primary coolant inlet port 104 of the reactor pressure vessel 100 does not cause any substantial pressure drop in the closed-loop primary coolant circuit 300 resulting from an increase in elevation. While the achievement of substantial zero pressure drop in the closed-loop primary coolant circuit 300 resulting from an increase in elevation is exemplified in terms of a horizontal flow, it is possible that such substantial zero pressure drop can be achieved by a decline in elevation as the primary coolant flows downstream in the closed-loop primary coolant circuit 300.

The flow of the primary coolant in the second path 212 is used to superheat the vapor-phase of the secondary coolant exiting the first and second horizontal steam generators 203, 204 via the first and second horizontal superheaters 205, 206 respectively, thereby further drying the vapor-phase of the secondary coolant. The use if the horizontal superheaters enhance the thermodynamic efficiency of the turbine cycle, carried out on the high pressure turbine 220 and the low pressure turbine 221.

The first and second horizontal superheaters 205, 206 are horizontally disposed shell-and-tube heat exchanger positioned directly above (and in series) with the first and second steam generators 203, 204 (FIG. 5). However, due to the slight increase in the elevation of the superheaters 205, 206 resulting from their location above the first and second horizontal steam generators 203, 204, the flow of the primary coolant in the second path 212 does cause some pressure drop in the closed-loop primary coolant circuit 300 resulting from an increase in elevation. However, because only a small amount (10% to 15%) of the total primary coolant that flows through the heat exchange subsystem 200 is directed into the second path 212 and through the horizontal superheaters 205, 206, the pressure drop does not significantly affect the desired natural circulation. Moreover, the increase in elevation is negligible when compared to the height of the flow driving water columns. In such an embodiment, at least 85% of the flow of the primary coolant through the heat exchange sub-system 200 is still entirely horizontal from the primary coolant outlet 103 to the primary coolant inlet 104 and does not cause any substantial pressure drop in the closed-loop primary coolant circuit 300 due to increase in elevation. Further, in certain alternate embodiments, the horizontal superheaters 205, 206 could be eliminated and/or repositioned to be in horizontal alignment with the horizontal steam generators 203, 204.

As shown in FIG. 5, the first and second horizontal steam generators 203, 204 are coupled directly to the each other and to the reactor pressure vessel 100. More specifically, the inlet of the first horizontal steam generator 203 is coupled directly to the primary coolant outlet port 103 of the reactor pressure vessel 100 while the outlet of the first horizontal steam generator 203 is coupled directly to the inlet of the second horizontal steam generator 204. The outlet of the second horizontal steam generator 204, is in turn, coupled directly to the primary coolant inlet port 104 of the reactor pressure vessel 100. The first and second horizontal steam generators 203, 204 are arranged so as to extend substantially parallel to one another, thereby collectively forming a generally U-shaped structure. Thus, the first path 211 also takes on a generally U-shape. In certain embodiments, the first and second horizontal steam generators 203, 204 are integrally welded to the reactor vessel 100 and to each other.

Figure 3A:
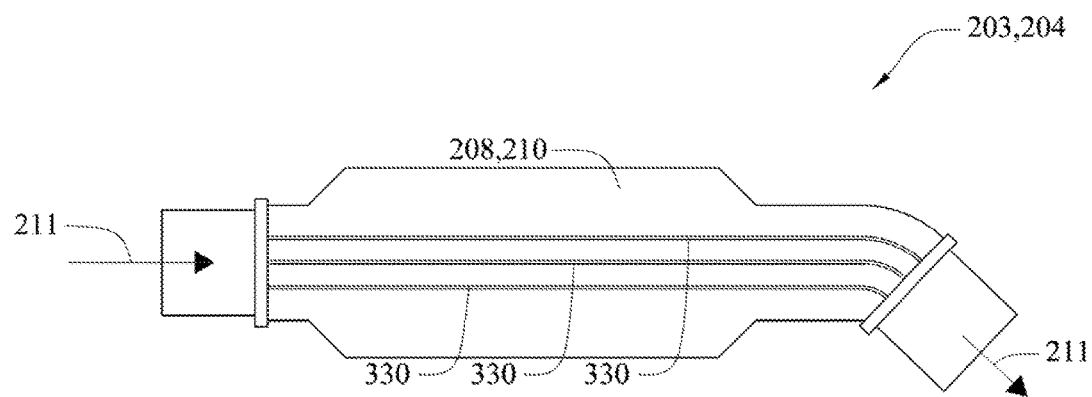
FIG. 3A is a schematic top view of a single-pass horizontal steam generator in accordance with an embodiment of the present invention.
Figure 3B:
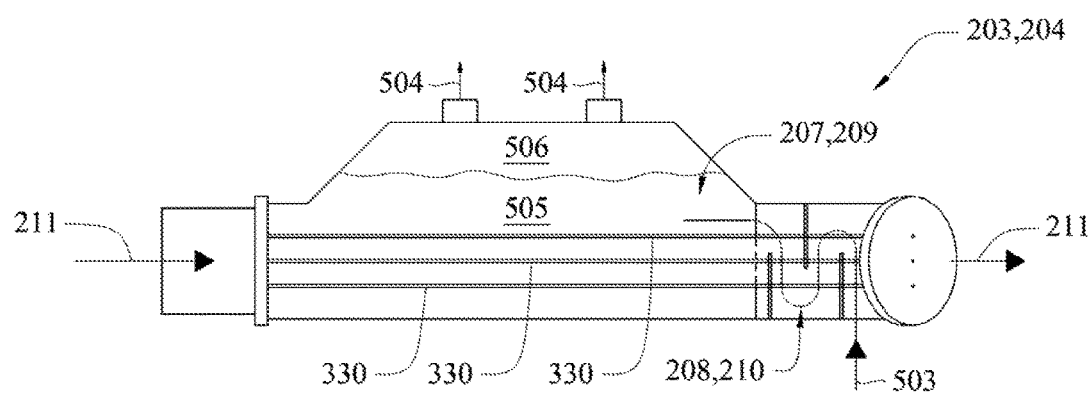
FIG. 3B is a schematic side view of the single-pass horizontal steam generator of FIG. 3A.

Referring now to FIGS. 2 and 3A-B, each of the first and second horizontal steam generators 203, 204 comprise a preheating zone 208, 210 and a boiling zone 207, 209. Both of the first and second horizontal steam generators 203, 204 are of the single-pass type in which the primary coolant flow of the first path 211 is the tube-side fluid. Each of the single-pass tubes 330 extend substantially horizontally through the preheating zones 208, 210 and the boiling zones 207, 209. The secondary coolant circuit has a main feedwater intake 501 and a return to condenser exit 502 into and out of the heat exchange sub system 200 respectively.

The secondary coolant, which is in the liquid-phase 505, enters each of the first and second horizontal steam generators 203, 204 along line 503. The incoming liquid phase 505 of the secondary coolant is preheated within the preheater zones 208, 210 of the first and second horizontal steam generators 203, 204. The secondary coolant in liquid-phase 505 flows through a tortuous path as shell-side fluid in the preheater zones 208, 210 and then enters the boiling zones 207, 209, where it is further heated by the primary coolant flow passing through the tubes 330. In the boiling zones 207, 209, the liquid-phase secondary coolant 505 vaporizes and exits the first and second horizontal steam generators 203, 204 as high pressure and low pressure steam 504 that is respectively supplied to the high and low pressure turbines 220, 221.

The shells of the horizontal steam generators 203, 204 and the horizontal superheaters 205, 206 provide additional barriers against potential large break LOCAs, as do the turning plenum and the eccentric flanges that join the steam generators 203, 204 to the reactor pressure vessel 100, as shown in FIGS. 4 and 5. All systems connected to the reactor vessel 100 use a similar approach to ensure that there is no potential for a large-break LOCA that could rapidly drain the water from the reactor vessel 100 and uncover the reactor core 102. As long as the reactor core 102 is covered under all potential conditions of operation and hypothetical accident, the release of radioactive material to the public is minimal.

As explained in the foregoing, the reactor system 1000 is an intrinsically safe reactor which, in the event of a problem external to the reactor containment building or within containment, is designed to automatically shut down in a safe mode with natural circulation cooling. Nevertheless, to instill maximum confidence, a number of redundant safety systems can be engineered to protect public health and safety under hypothetical accident scenarios that are unknown or unknowable, i.e., cannot be mechanistically postulated. In the case of an abnormal condition when the normal heat transport path through the steam generators are not available, then the pressure in the reactor vessel 100 will begin to increase. In such a case rupture discs will breach allowing the reactor coolant to flow into a kettle reboiler located overhead. The kettle will have a large inventory of water that will serve to extract the heat from the reactor coolant until the system shuts down. Diverse systems perform duplicate or overlapping functions using different physical principles and equipment to ensure that a common-mode failure is impossible.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. A natural circulation nuclear reactor system comprising:
- a reactor pressure vessel having a body comprising an internal cavity containing a primary coolant, a first portion of the reactor pressure vessel located above a ground level and a second portion of the reactor pressure vessel located below the ground level within a reactor well comprising vertical walls and a floor;
- a partition dividing the internal cavity of the reactor pressure vessel into a primary coolant riser passageway and a primary coolant downcomer passageway, wherein the partition is configured to prohibit cross-flow of the primary coolant between the primary coolant downcomer passageway and the primary coolant riser passageway at a top portion of the reactor pressure vessel;
- a reactor core comprising nuclear fuel disposed within the primary coolant riser passageway of the internal cavity at a bottom portion of the reactor pressure vessel;
- the reactor pressure vessel comprising a primary coolant outlet port in fluid communication with a top portion of the primary coolant riser passageway and a primary coolant inlet port in fluid communication with a top portion of the primary coolant downcomer passageway;
- a heat exchange sub-system located outside of the reactor pressure vessel, the primary coolant outlet port fluidly coupled to the heat exchange sub-system to form an incoming hot leg of the heat exchange sub-system and the primary coolant inlet port fluidly coupled to the heat exchange sub-system to form an outgoing cold leg of the heat exchange sub-system;
- a closed-loop primary coolant circuit that flows the primary coolant through the reactor pressure vessel to cool the reactor core and through the heat exchange sub-system to transfer heat to a secondary coolant, wherein the reactor core heats the primary coolant which flows via natural circulation through the closed-loop primary coolant circuit in a single phase;
- a first annular reactor flange welded to the first portion of the reactor pressure vessel and seated on top of a concrete slab which at least partially covers the reactor well and defines the ground level;
- the first reactor flange supporting the entire weight of the reactor pressure vessel in a vertically oriented cantilevered manner in which the reactor pressure vessel is spaced apart from vertical wall surfaces and a bottom end of the reactor pressure vessel receives no support from the floor of a reactor well, wherein the reactor pressure vessel is free to radially and axially expand due to thermal expansion as the reactor core heats up during operation; and
- a second annular reactor flange welded to the first portion of the reactor pressure vessel above ground level and located above the first flange, and a plurality of welded lugs extending vertically between the first and second flanges, and wherein the primary coolant inlet and outlet ports are located between the first and second flanges on the first portion of the reactor pressure vessel.

2. The natural circulation nuclear reactor system according to claim 1 wherein the partition comprises a first portion having a first end that is coupled to an inner surface of the reactor pressure vessel and a second portion that extends from the first portion to a terminal end of the partition, the terminal end of the partition spaced from a floor of the reactor pressure vessel, a bottom plenum formed between the terminal end of the partition and the floor of the reactor pressure vessel that allows cross-flow of the primary coolant from the primary coolant downcomer passageway to the primary coolant riser passageway, wherein operation of the reactor core causes the primary coolant to rise within the primary coolant riser passageway.

3. The natural circulation nuclear reactor system according to claim 2 wherein the primary coolant within the primary coolant riser passageway is fluidly coupled to the primary coolant within the primary coolant downcomer passageway only at the bottom plenum.

4. The natural circulation nuclear reactor system according to claim 2 wherein the primary coolant outlet port is located at an elevation above the first end of the first portion of the partition and wherein the primary coolant inlet port is located at an elevation below the first end of the first portion of the partition.

5. The natural circulation nuclear reactor system according to claim 1 wherein the partition is a multi-layer construction comprising an insulating layer that is sandwiched between two outer layers, wherein the insulating layer comprises a refractory material and the two outer layers comprise stainless steel.

6. The natural circulation nuclear reactor system according to claim 1 wherein the partition has an effective coefficient of thermal conductivity measured from the primary coolant riser passageway to the primary coolant downcomer passageway that is less than an effective coefficient of thermal conductivity of the primary coolant.

7. The natural circulation nuclear reactor system according to claim 1 wherein the partition comprises a first wall portion that is parallel and spaced apart from an inner surface of the reactor pressure vessel and a second wall portion that extends transversely from the first wall portion to the inner surface of the reactor pressure vessel, the first wall portion having an inner surface and an outer surface, the inner surface of the first wall portion forming the primary coolant riser passageway, and the primary coolant downcomer passageway being formed between the outer surface of first wall portion and the inner surface of the reactor pressure vessel with the second wall portion having an annular structure which encloses a top of the primary coolant downcomer passageway, the primary coolant downcomer passageway being an annular passageway that circumferentially surrounds the primary coolant riser passageway.

8. The natural circulation nuclear reactor system according to claim 1 wherein the reactor pressure vessel extends along a substantially vertical axis, wherein the second portion of the reactor pressure vessel comprises a major portion of an axial length of the reactor pressure vessel, wherein the reactor core is located below the ground level, and wherein the primary coolant outlet port, the primary coolant inlet port, and the heat exchange sub-system are located above the ground level.

9. The natural circulation nuclear reactor system according to claim 8 wherein the major portion of the reactor pressure vessel is at least 75% of the axial length of the reactor pressure vessel and is free of penetrations.

10. The natural circulation nuclear reactor system according to claim 1 wherein the natural circulation nuclear reactor system is free of active equipment for forcing circulation of the primary coolant through the closed-loop primary coolant circuit.

* * * * *